O. C. DAVIS.
PNEUMATIC TIRE.
APPLICATION FILED NOV. 20, 1915.
1,188,739.
Patented June 27, 1916.
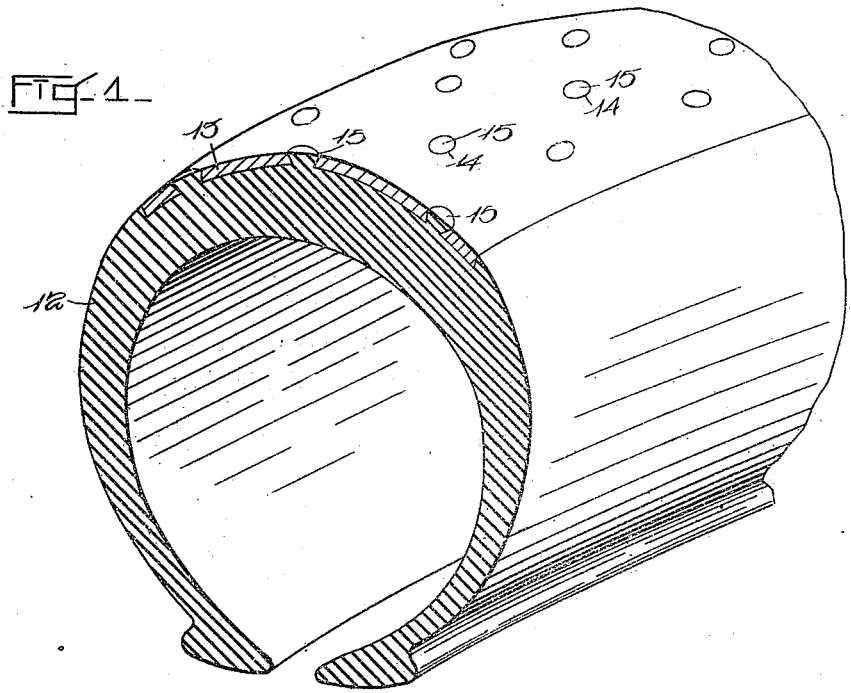
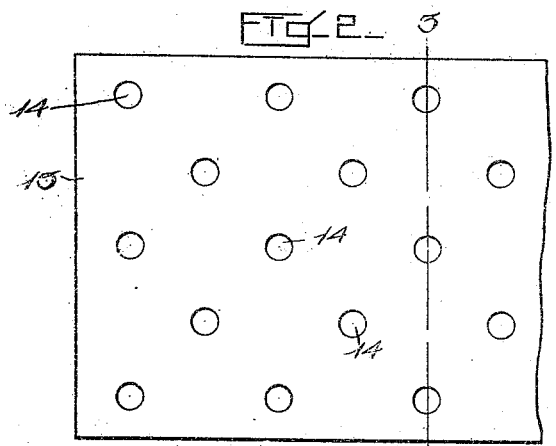
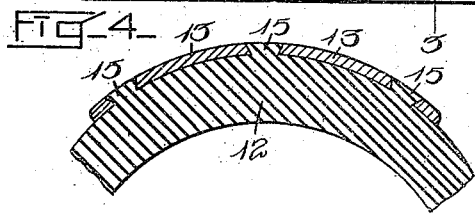
INVENTOR=
OSCAR C. DAVIS
ATTORNEYS

UNITED STATES PATENT OFFICE.

OSCAR C. DAVIS, OF BROCKTON, MASSACHUSETTS.

PNEUMATIC TIRE.

1,188,739.

Specification of Letters Patent. Patented June 27, 1916.

Application filed November 20, 1915. Serial No. 62,623.

*To all whom it may concern:*

Be it known that I, OSCAR C. DAVIS, a citizen of the United States, residing at Brockton, in the county of Plymouth and State of Massachusetts, have invented new and useful Improvements in Pneumatic Tires, of which the following is a specification.

This invention relates to the shoe or casing inclosing the inner air tube of a pneumatic tire, and has for its object to provide a shoe having simple and effective reinforcing means minimizing the liability of puncturing the shoe and the air tube, and adapted also to resist wear of the tread surface.

The invention is embodied in the improvements which I will now proceed to describe and claim.

Of the accompanying drawings forming a part of this specification: Figure 1 represents a perspective sectional view of a portion of a tire shoe embodying my invention; Fig. 2 represents a plan view of a portion of the reinforcing member detached; Fig. 3 represents a section on line 3—3 of Fig. 2; Fig. 4 represents a fragmentary sectional view illustrating a different embodiment of the invention.

The same reference characters indicate the same or similar parts in all the views.

In the drawings: 12 represents the body of a tire shoe or casing composed wholly or in part of rubber, it being understood that the shoe may include layers of frictioned fabric (not shown) and surface portions of rubber united thereto in the usual way.

In carrying out my invention, I apply to the body 12 a flexible reinforcing member 13 of suitable puncture-resisting material formed and arranged to protect an inner tube inclosed in the shoe from puncture by a nail or other instrumentality encountering the tread surface of the shoe, the nature of said reinforcing member being such that it is adapted to be united to the rubber of the shoe by vulcanization, and to withstand vulcanizing heat without injury.

The preferred material of the reinforcing member 13 is chrome-tanned leather, this material being not only flexible but tough, so that it is not easily punctured by a nail or the like. The said material is also adapted to withstand vulcanizing heat without being injured in any way thereby, and has a high degree of resistance to wear. The body 12 and member 13 are assembled before the rubber is vulcanized, and are then united by vulcanization.

I prefer to provide the member 13 with openings 14, which may be formed and arranged as shown by Figs. 2 and 3. When the member 13 is pressed against the unvulcanized body 12, portions of the rubber are forced into said openings and form studs or projections 15, which increase the strength of the union, the said projections being formed before the rubber is vulcanized and united to the walls of the openings by vulcanization. The openings 14 are preferably of tapering or dovetail form, so that the projections 15 formed therein are interlocked with the member 13. When the member 13 is on the exterior of the shoe, and forms the tread surface thereof, as shown in Figs. 1 and 4, the wear-resisting property of the member is utilized in prolonging the useful life of the shoe, it being a fact that chrome-tanned leather presents greater resistance to wear than the rubber usually employed in tire shoes. While I do not limit myself to chrome-tanned leather, I know of no material comparable thereto for the purposes stated. The outer surface of the member 13 may be flush with the outer surface of the shoe at opposite edges of said member, as shown by Fig. 1, or raised above said shoe surface, as shown by Fig. 4. When the member 13 is externally applied, the margins of the openings 14 form anti-skidding shoulders which are caused to project slightly from the outer ends of the projections 15 by the compression or the wearing away of said projections.

The inner surface of the member 13, when the latter is made of chrome-tanned or other leather, is preferably treated to cause it to present a multiplicity of minute slightly projecting fibers or rootlets which become embedded in the unvulcanized rubber and increase the firmness of the union caused by vulcanization. These fibers or rootlets may be formed by cutting away one of the original surfaces of the leather, thus forming a surface which differs from the original surface in that it is fuzzy, the fuzz being formed by the fibers severed by the cutting operation. A similar surface may be formed by abrading one of the surfaces of the leather.

As shown by Fig. 1, the reinforcing member 13 and the rubber projections 15 collectively form a tread surface, the greater portion of the area of which is formed by the reinforcing member, so that liability of puncturing the tread surface through a projection 15 is reduced to a relatively negligible minimum.

Having described my invention, I claim:

A pneumatic tire shoe or casing comprising a body composed wholly or in part of rubber, and a flexible tread member of wear- and puncture-resisting material having a multiplicity of relatively small and widely spaced openings into which portions of the material of the body extend, said portions forming studs integral with the rubber body, said body and studs being integrally united respectively to the inner side of the tread member and to the walls of the openings therein by vulcanization, whereby the tread member is inseparably secured to the body, the size and spacing of said openings and studs being such that the tread member constitutes the greater part of the area of a composite tread formed by the tread member and studs, whereby liability of puncturing the said tread is reduced to the minimum.

In testimony whereof I have affixed my signature.

OSCAR C. DAVIS.